United States Patent [19]

Hall et al.

[11] 4,087,069
[45] May 2, 1978

[54] SUSPENSION SYSTEM FOR WIDE SEAT

[75] Inventors: Garth O. Hall; Harvey N. Tengler, both of New Berlin; Narendra J. Shah, Milwaukee, all of Wis.

[73] Assignee: UOP Inc., Des Plaines, Ill.

[21] Appl. No.: 699,115

[22] Filed: Jun. 23, 1976

[51] Int. Cl.² .................... F16M 11/00; A47C 3/22
[52] U.S. Cl. .................. 248/400; 297/307; 267/156; 267/120; 5/118
[58] Field of Search ............ 248/400, 399, 373, 389; 297/307, 308, 309; 5/118; 267/156, 157

[56] References Cited

U.S. PATENT DOCUMENTS

| | | | |
|---|---|---|---|
| 1,674,215 | 6/1928 | Montgomery | 5/118 X |
| 3,003,357 | 10/1961 | Votta | 267/156 X |
| 3,036,805 | 5/1962 | Hickman | 248/373 X |
| 3,100,101 | 8/1963 | Trevaskis | 248/400 |
| 3,371,359 | 3/1968 | Dome | 5/118 |
| 3,882,558 | 5/1975 | Christensen | 248/400 X |
| 3,954,245 | 5/1976 | Costin | 248/400 |

Primary Examiner—Francis K. Zugel
Attorney, Agent, or Firm—James R. Hoatson, Jr.; Barry L. Clark; William H. Page, II

[57] ABSTRACT

Suspension system for wide seats having a rigid occupant supporting member has a pair of parallel, rotatable drums mounted to a rigid portion of a vehicle at a fixed horizontal distance from each other. A plurality of flexible web or cable support members attached to each of said pair of drums are attached to vertically spaced attachment points on the adjacent rigid occupant supporting member portion of the suspended seat and insure that the seat moves up or down as the drums rotate. Those flexible support members which are attached to upper attachment points on said rigid supporting member are in contact with lower peripheral surfaces of the adjacent drum when the seat is in its mid-ride position while the remaining flexible support members which are attached to lower attachment points on said rigid supporting member are in contact with upper peripheral surfaces of the adjacent drum when the seat is in its mid-ride position. The drums are linked together for simultaneous rotation at the same peripheral surface speed by a flexible member which insures that the seat's occupant supporting member will move up and down uniformly no matter how unevenly it is loaded. A yieldable means such as an air spring resists downward forces applied by the seat and its occupant(s). In a modification, the drums are located under the front and rear portions of a seat where they serve as fore and aft isolation means in addition to providing vertical isolation.

13 Claims, 5 Drawing Figures

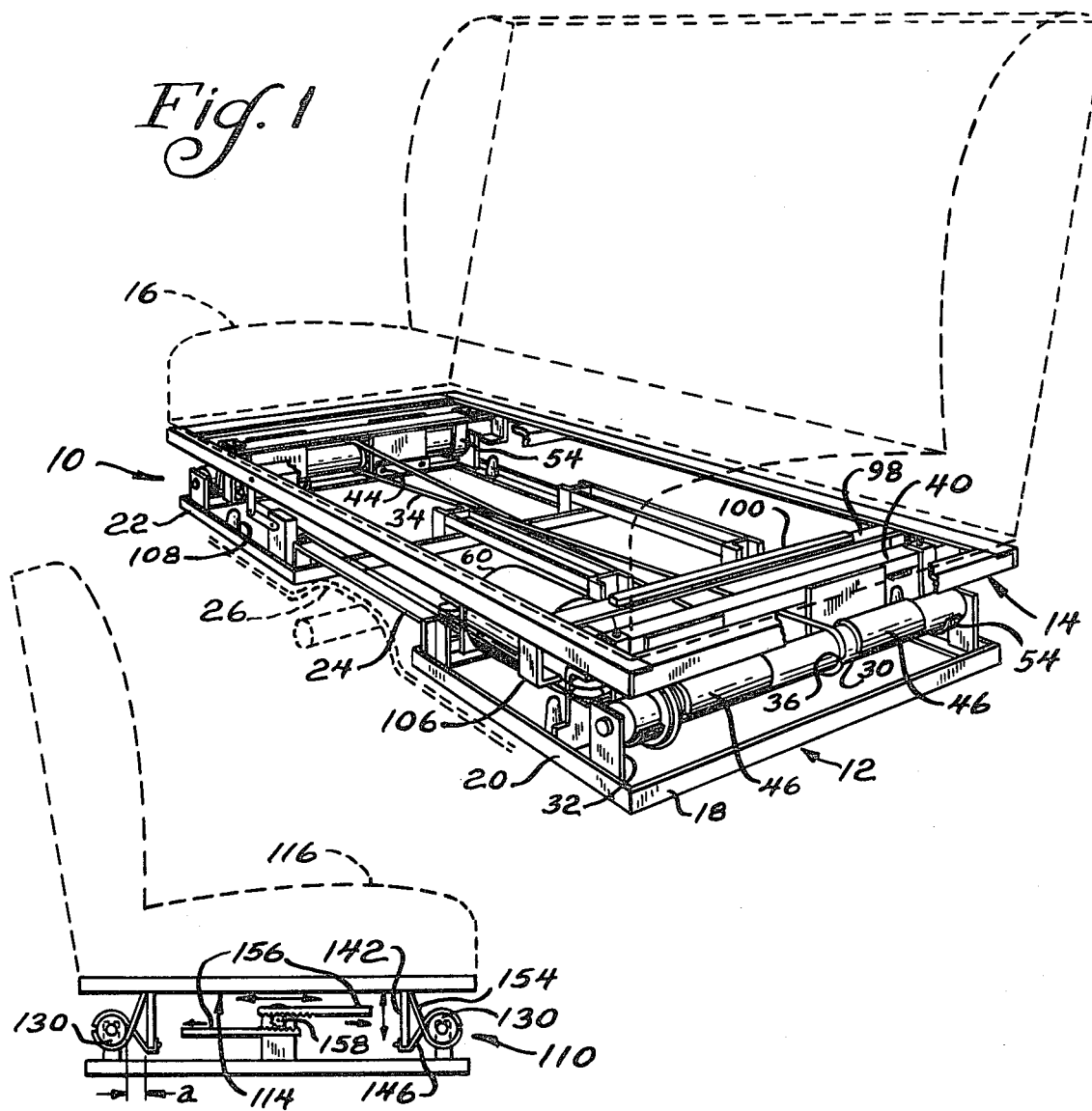
Fig. 1
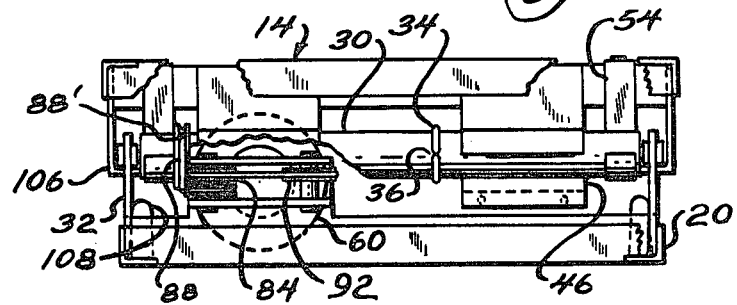
Fig. 2
Fig. 3

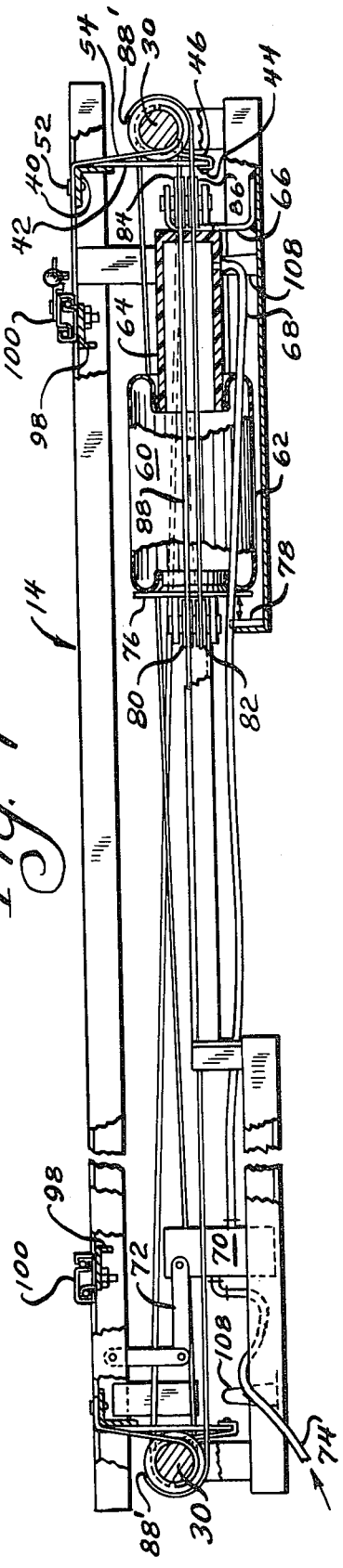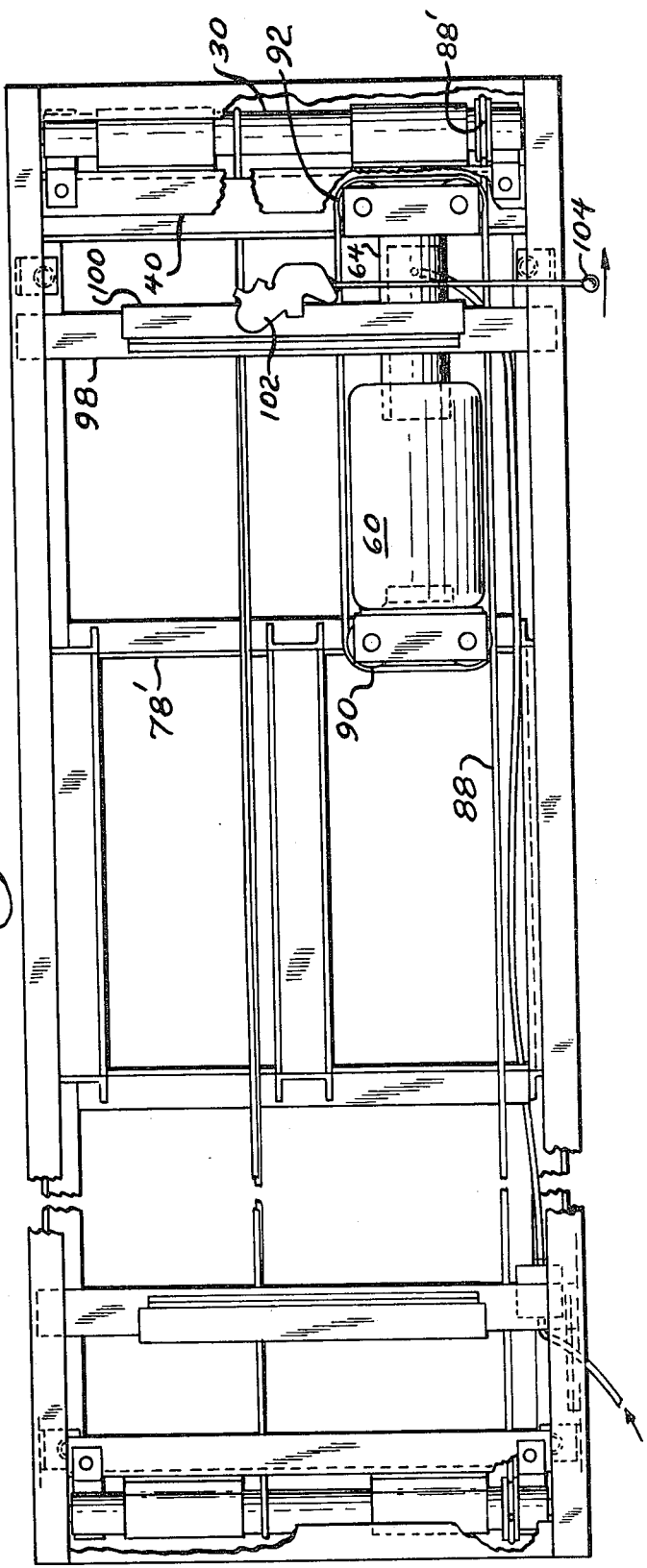

SUSPENSION SYSTEM FOR WIDE SEAT

BACKGROUND OF THE INVENTION

This invention relates to suspension systems and particularly to suspension systems for seats and sleeper bunks used in trucks. Although a seat suspension would normally provide no particular benefit in an automobile which can be designed to provide a soft, comfortable ride, it is quite desirable in trucks which conventionally have stiff suspensions to accommodate heavy loading conditions. Unfortunately, the rather substantial cost of suspension seats has generally limited their use to the driver's seat position on heavy trucks. As a result, passengers in the cabs of heavy trucks must endure a gret deal of physical discomfort. Light and medium duty trucks are generally equipped with bench type seats and fixed back cushions. When such vehicles are empty or only lightly loaded their occupants are subjected to a great deal of bouncing which causes their backs to rub up and down and slap the seat back cushion.

In an effort to increase passenger comfort, consideration has been given to mounting a bench seat on a suspension such as that shown in Simons et al U.S. Pat. No. 3,109,621. The result is less than completely satisfactory since one would either have to utilize a pair of complete suspensions, with their consequent cost and weight, under the ends of the bench, or the suspension and seat base would have to be made extremely rigid and heavy to carry the load from one side of the seat to the other.

U.S. Pat. No. 3,760,436 to Zach et al. shows a suspension for a sleeper bunk of a type usable in trucks where one occupant sleeps while the other drives. Since the unit incorporates a single pair of scissors link suspension members it will be obvious that the suspended platform would have to be made quite rigid and heavy if it was to be used as a wide seat support rather than as a mattress support. Christensen U.S. Pat. No. 3,882,558, shows a suspended sleeper bunk which comprises a bottom frame carrying a rotatable drum at each end. The drums support a mattress support platform hanging downwardly therefrom by means of flexible webs. Since the drums are connected for simultaneous rotation, the platform tends to remain level when loading is applied between the drums. However, loading applied beyond the drums would tend to lift the unsupported opposite end of the platform since the flexible webs can only resist downward loads. Thus, the system would not be suitable for suspending a wide seat which would be subject to downward loading at its ends and horizontal loading into the back of the seat.

SUMMARY

It is among the objects of the present invention to provide an effective, dependable, light weight and low cost suspension for isolating vertical vibrations in wide seats such as bench seats in trucks and other vehicles.

It is another object of the present invention to provide a wide seat suspension which takes up very little space beneath the seat and does not interfere with the drive shaft tunnel.

Yet another object of the invention is to provide a wide seat suspension which permits the seat to remain level regardless of whether it is loaded between its supports or at its ends.

These and other objects are accomplished by the seat suspension of the present invention which includes a pair of horizontally spaced apart drums having parallel axes of rotation which are fixedly rotatably mounted to a lower frame which is mounted to a rigid part of a vehicle such as its floor. An upwardly and downwardly movable upper frame includes downwardly extending brackets adjacent each drum. The upper frame is supported by a plurality of flexible members such as webs or cables which are affixed to each drum at one of their ends. The other ends of the flexible members are attached to either the lower portion of the brackets at a point lower than the drum axis or to the upper frame or upper portion of the brackets at a point higher than the drum. The downwardly extending flexible members, which are attached to the lower portion of the brackets, partially encircle an upper portion of the drum and serve to support loads applied downwardly between the drums. The upwardly extending flexible members partially encircle lower portions of the drums and serve to prevent lifting of the upper frame under the application of upward forces such as the lifting force introduced at one end of the seat by a downward force applied outwardly of the drum at the other end of the seat, or the lifting force at the front edge of the seat caused by an occupant leaning against the seat back. The nature of the support provided by the downwardly extending flexible members is somewhat similar to the support provided by the structure shown in the aforesaid Christensen U.S. Pat. No. 3,882,558. However, in our design, the brackets extend sufficiently far down to insure that the lower ends of the downwardly extending flexible members will never move upwardly past the plane containing the axes of the two drums. This dimensioning of the brackets not only helps provide increased resistance to lateral movement as compared to Christensen but also insures that the vertical displacement of the bracket will be equal to the surface displacement of the drum as it rotates. Thus, the upwardly and downwardly extending flexible members will move in synchronism and remain taut and able to resist upward and downward forces in all positions of the seat in its range of vertical isolation movement. In the Christensen design, the vertical movement component of the supported platform will differ from the rotary displacement of the drum surface as the bracket moves upwardly and the point of tangency of the web and drum moves to locations higher than the plane containing the axes of the drums.

The spaced drums which are utilized in the improved suspension are preferably at the ends of a wide seat and aligned with the fore and aft direction of the seat so that the seat can be mounted with a minimum clearance over the vehicle's drive shaft tunnel. However, where such clearance is not necessary, or where the suspension is used with a seat for a single occupant, the spaced drums can be located adjacent to and parallel with the front and back edges of the seat. In this latter configuration, the downwardly extending upper frame brackets can be spaced from the drums so that some fore and aft movement of the seat is possible before the drums contact the brackets. To allow such movement, one of each set of flexible support members must have some resiliency to permit stretching. Where the flexible support members are webs, the resilient one could utilize a fabric with sufficient stretch capability to permit the necessary movement. A total fore and aft movement capability of up to about 5 cm provides excellent fore and aft isolation in many applications. If desired, a limit means can be provided to limit the horizontal movement of the brackets relative to the drums while permitting vertical movement when fore and aft isolation is not required.

The suspension of the present invention remains level irrespective of the unevenness of the loading of the seat due partly to a cable which connects the two drums together for simultaneous rotation and due partly to the provision for the aforementioned upwardly extending flexible support members which prevent the front of the seat from lifting when an occupant leans back and prevents one end from lifting when large downward pressures are applied to the other end. The capability of the suspension to isolate the seat against vertical vibrations is derived from an air cushion comprising a hollow piston and a flexible bag which are connected to a source of air under pressure and are actuated through a pulley system in response to drum rotation. An air valve movable with the seat operates to add air to the system or subtract it so that the seat will normally remain centered in a "mid-ride" position regardless of the weight of the seat occupants. Since normal vehicle vibrations usually have a frequency higher than 1 Hz, the air valve is provided with about a 3 second delay so that air additions are not made in response to vertical seat movements caused by ordinary vibrations but only those caused by movements of long duration such as the application of a person's weight to the seat.

BRIEF DESCRIPTION OF THE DRAWINGS

FIG. 1 is a partially broken away perspective view of the improved suspension showing its relationship to a bench seat which is shown in dotted lines;

FIG. 2 is a side elevational view of an alternative embodiment of the improved suspension mounted so as to perform as a fore and aft isolator mechanism, with most of the structure omitted for clarity;

FIG. 3 is an end elevation, partially broken away, of the suspension of FIG. 1;

FIG. 4 is a front elevation, partially sectioned and partially broken away, of the suspension of FIG. 1; and FIG. 5 is a top view, partially broken away, of the suspension of FIG. 1.

DETAILED DESCRIPTION

Referring to FIG. 1, the improved wide seat suspension is indicated generally at 10 and includes a fixed lower frame indicated generally at 12 and a movable upper frame indicated generally at 14. A bench type seat indicated in dotted lines at 16 may be mounted on the movable upper frame 14 by means of conventional fore and aft slide rails 100 which will be hereinafter described. The fixed lower frame 12 includes a pair of end frame members 18 which are connected to each other by longitudinally extending members such as the front frame members 20, 22. Where the suspension 10 is to be mounted in a vehicle having a floor which is not flat, the center front frame portion 24 may be positioned higher than the portions 20, 22 so as to provide clearance for obstructions such as a drive shaft tunnel indicated in dotted lines at 26.

The suspension comprises a pair of drums 30 at each end of frame 12 which are mounted for rotation in drum support brackets 32. Synchronous rotation of the two drums regardless of where the loading is applied to seat 16 is assured by cable means 34 which is arranged in a generally figure eight configuration between the drums 30 and is locked to each of them at 36. A pair of fore and aft extending angle bars 40 serve to rigidify the upper frame 14 and also provide support for downwardly extending bracket plates 42 (FIG. 4) which extend below the axes of the drums 30 in any position of the suspension 10 and are attached at their bottom edges by means of fasteners 44, such as rivets, to downwardly extending flexible members 46 such as wide webs made of a rubberized strong fabric such as nylon. The flexible members 46, which carry all of the downward loading of the seat, extend upwardly over the top surface of the drums 30 and are anchored to the drums by fastening means (not shown) such as mechanical fasteners. Fastening means 52, such as rivets, secure upwardly extending flexible members 54 to the angle bars 40. The lower end of the flexible members 54 partially encircle the drums 30 and are fastened thereto by fastening means (not shown).

Referring to FIG. 4, one can see that up and down movement of the movable frame 14 will be transmitted by flexible members 54, 46 respectively to the drums 30 to cause clockwise and counterclockwise rotation thereof. A predetermined resistance against rotation is provided to the drums 30 by means of an air spring 60 which comprises a movable rubber bag portion 62 mounted on the open end of a hollow plastic piston member 64 which is carried at its closed end by a piston support bracket 66 attached to the frame 12 (FIG. 1). When an occupant sits on or leaves the seat 16 it is desirable to add or remove air from the air spring 60 in order to maintain the upper frame 14 in a "mid-ride" position. The air enters or leaves the air spring 60 through an air line 68 connected at one end to the piston 64 and at the other end to an air valve 70 which is controlled by a movable linkage 72 and connected by an air line 74 to a source of pressurized air. The air valve 70 incorporates a time delay so that air will not be admitted to or released from the air spring 60 due to movements of the linkage 72 caused by normal vibrations of the frame 14 during use. The time delay period is preferably about 3 seconds whereas ordinary vibrations to which the mechanism would be subjected would be of a faster frequency. A movable rubber bag portion 62 of the air spring 60 is attached to an end plate 76 which moves with the rubber bag up to the limit of travel determined by a resilient end stop member 78 carried by the cross bar 78' which connects the front and rear portions of the lower frame 12. The movable end plate 76 provides support for an upper forward movable pulley 80, a lower forward movable pulley 82 and a rearward movable pulley 90. An upper forward fixed pulley 84, a lower forward fixed pulley 86 and a rearward fixed pulley 92 are carried at the fixed end of the air spring 60 on piston support bracket 66. A flexible cable member 88 fixed at its ends 88' to the spaced drums 30 transmits forces between the drums 30 and the air spring 60 in the following manner. Starting at the right end drum 30 in FIG. 4 the cable 88 passes downwardly over the right side of the drum and then to the left over pulleys 86, 82, to the rear and back toward the right over pulleys 90, 92, and then forwardly and to the left over pulleys 84, 80 from which it passes to the left end drum 30. The aforementioned pulley arrangement permits a 2.5 cm movement of the air bag 62 to result in 5 cm of total movement of cable 88 or 2.5 cm at each end of the cable. Since the cable 88 is attached to the drums 30 at a greater radius from the axis of the drums than are the webs 46, 54, the vertical movement of the movable frame 14 will be about 1.7 cm. This represents about a 51° rotation of the drums 30 for the particular dimensional relationships shown in the drawings. The particular pulley arrangement used is a matter of choice dependent on the size and capacity of the air spring and the amount of vertical seat movement desired.

A pair of cross bars 98 (FIGS. 4 and 5) provide additional rigidity to the upper frame 14 and also serve as mounting members for a pair of fore and aft slide rails 100 which carry the frame (not shown) of a seat (shown in dotted lines in FIG. 1 at 16). A latch mechanism 102 associated with the slide rails 100 is actuated manually by handle 104 to permit seat 16 to be moved to various positions of fore and aft adjustment. In order to provide positive restraints of the movable frame 14 relative to the fixed frame 12 a plurality of stop brackets 106 (FIG. 1) are preferably carried by the upper frame 14 so as to be in alignment with resilient bumper members 108 carried by the lower frame 12. The stops 106 and bumpers 108 determine the lower limit of movement of the frame 14 while the contact between end plate 76 on air spring 60 and the resilient pad 78 or cross bar 78' determine the upper limit of movement.

FIG. 2 shows an alternative mounting of a suspension 110 relative to a seat 116. Since the suspension 110 would be generally identical to the suspension 10 shown in FIGS. 1-4, most of the details of the suspension have been eliminated for clarity. The main distinction between the FIG. 2 suspension and that shown in the other Figures is that the drums 130 are mounted at the front and rear of the seat 116 rather than at its sides. By mounting the suspension in this manner and by spacing the brackets 142 from the drums 130 one can see that the seat 116 will be free to move forward or backward by twice the distance of dimension $a$ which is the distance between the bracket 142 and the drums 130. To permit such fore and aft movement, one of each set of flexible support members must have some elasticity. For example, in pair 146, 154, member 154 would be both flexible and elastic. Preferably, the spacing of $a$ is such that the seat 116 can move over a range of up to about 5 cm to provide fore and aft isolation to an occupant of the seat 116 in addition to the vertical isolation provided by the suspension 110. When fore and aft isolation is not desired, such as when traversing extremely rough terrain, a limit stop means such as movable stops 156 can be brought into engagement with each of the brackets 142 by means of a geared adjustment knob 158, for example. The stops 156 would limit fore and aft travel while permitting vertical travel as the webs 146, 154 wind and unwind relative to drums 130.

The embodiment of FIGS. 1 and 3-5, utilizes relatively wide webs 46, 54 to connect the movable frame 14 to the drums 30. Since the wide webs would restrict fore and aft horizontal movement of the movable frame, it is contemplated that, where fore and aft isolation is desirable, the flexible wide webs 46, 54 could be replaced with flexible cables.

We claim as our invention:

1. In a suspension system for providing isolation from vertical vibrations to an occupant support member which is adapted to be mounted for vertical reciprocatory movement relative to the body of a vehicle, the improvement comprising a pair of parallel, spaced apart drum members adapted to be mounted relative to said body for rotation about axes which are located under said support member and inwardly of a pair of opposed sides thereof; a plurality of first and second flexible support members fixed at one end thereof to each of said drum members and fixed at the other end thereof to first and second mounting members which are fixedly mounted relative to said occupant support member adjacent each of said drum members and at spaced locations along the length thereof, said first flexible support members each being fixed at their said other end to portions of said first mounting members which are positioned above said drum members, said first flexible support members passing around the lower periphery of the nearest drum when said occupant support member is midway in its range of vertical travel, said second flexible support members being fixed to portions of said second mounting members which are at all times positioned below the plane of the axes of the drum members, said second flexible support members passing around the upper periphery of the nearest drum when said occupant support member is midway in its range of vertical travel, means for joining said pair of drum members for simultaneous rotation at the same peripheral surface speed in response to upward and downward movement of said occupant support member, and yieldable means for resisting vertical movement of said occupant support member.

2. The suspension system of claim 1 wherein said drum members are located adjacent the ends of a multi-passenger bench seat.

3. The suspension system of claim 2 wherein said drum members are positioned outboard of said mounting means.

4. The suspension system of claim 1 wherein said yieldable means comprises an air spring.

5. The suspension system of claim 4 wherein said drum members are connected to each other by a cable which completely encircles said air spring in a loop defined by a plurality of guide members, the guide members at opposed ends of said air spring being movable by said air spring relative to each other to lengthen or shorten said loop and thereby cause rotation of said drum members and lifting or lowering of said occupant support member.

6. The suspension system of claim 5 wherein said guide members comprise six pulley wheels.

7. The suspension system of claim 5 wherein a stop member limits the axial extension of said air spring and thus the maximum size of said loop, thereby limiting the upward movement capability of said suspension.

8. The suspension system of claim 1 wherein said drum members are located relative to said occupant support member so as to be adjacent the front and rear portions of a seat adapted to be mounted on said support member, said drum members being spaced from said first and second mounting members so as to permit said plurality of first and second flexible support members to provide a predetermined amount of unrestrained fore and aft movement of said support member in order to isolate the support member from fore and aft vibrations of the vehicle body.

9. The suspension system of claim 8 wherein said plurality of first flexible support members are resilient.

10. The suspension system of claim 8 wherein lockout means are provided for preventing said predetermined amount of unrestrained fore and aft movement from occurring.

11. The suspension system of claim 8 wherein said predetermined amount of fore and aft movement is approximately 5 cm.

12. The suspension system of claim 1 wherein said flexible support members comprise webs.

13. The suspension system of claim 1 wherein said flexible support members comprise cables.

* * * * *